Patented Feb. 19, 1929.

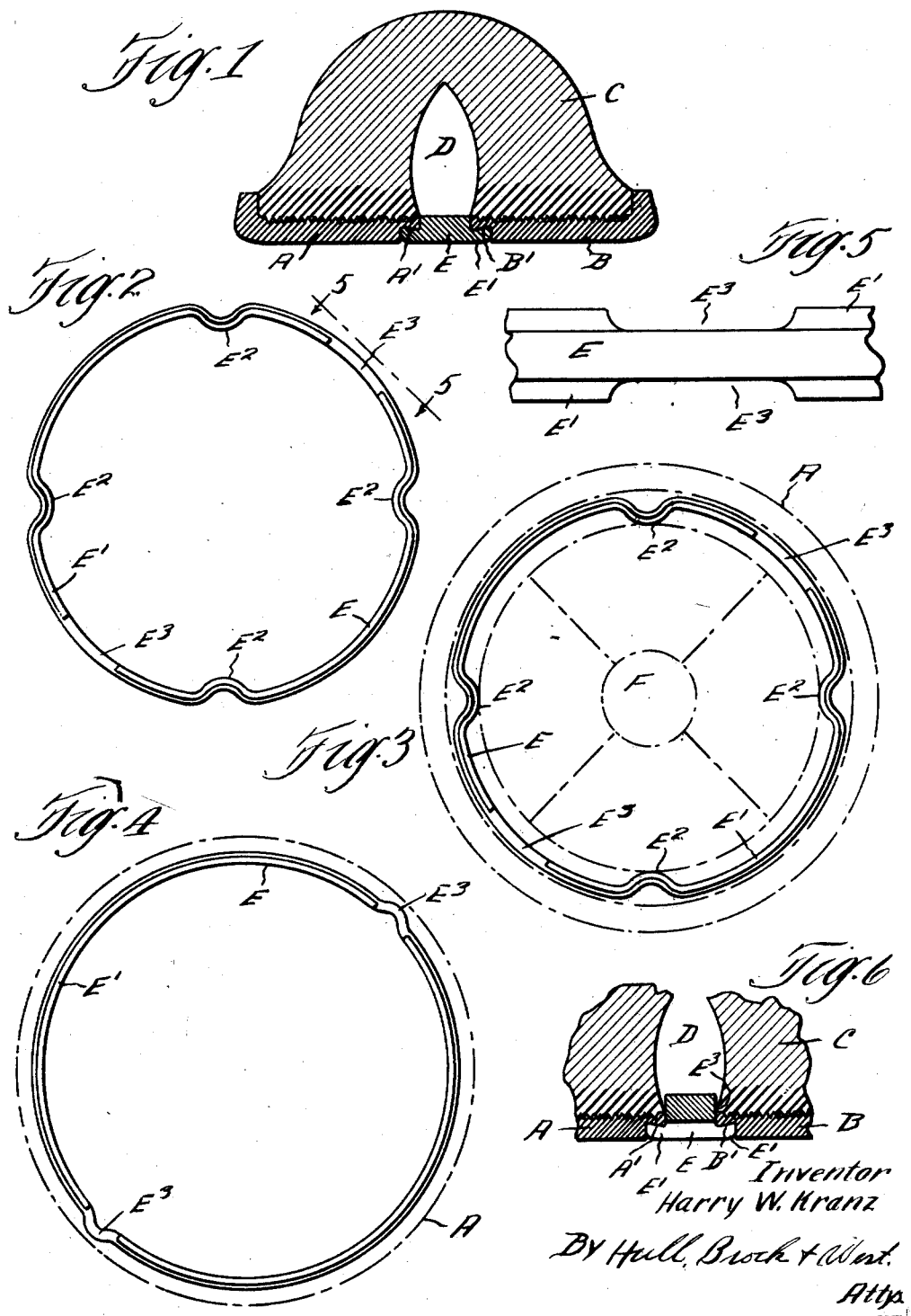

1,702,386

UNITED STATES PATENT OFFICE.

HARRY W. KRANZ, OF CLEVELAND, OHIO, ASSIGNOR TO THE HYDRAULIC STEEL COMPANY, OF CLEVELAND, OHIO, A CORPORATION OF OHIO.

CUSHION-TIRE BASE.

Application filed April 26, 1923. Serial No. 634,663.

This invention relates generally to vehicle tires having a rubber cushion body of arched or internally recessed form vulcanized on a metal base or rim, there being a core employed for forming the recess or channel to the rubber body, which core is withdrawn after the vulcanization has been completed, and my invention resides mainly in affixing to the two side sections of the rim base, a central ring portion to be interlocked with the side portions of the base, providing a continuous tire base which can be affixed to the wheel body in any preferred manner.

One object of my invention is to provide a central ring of such construction that the same can be quickly and easily introduced into the divided rim base and forced into locked relation therewith under compression, and a further object is to provide a ring embodying these characteristic features which can be upset at definite intervals to provide a lock between the central and side portions of the rim base against possible circumferential movement.

With these objects in view the invention consists in the novel form of rim base and method of making the same.

In the drawings forming a part of this specification Fig. 1 is a sectional view showing a cushion tire applied to a rim base constructed in accordance with my invention; Fig. 2 is a side view of my construction of central ring before the same is introduced between the side members of the base; Fig. 3 is a similar view illustrating the manner of compressing the central ring into engagement with the side members of the rim base; Fig. 4 is a similar view showing the central ring after it has been compressed into engagement with the side members of the base; Fig. 5 is a detail plan view of a portion of the central ring and Fig. 6 is a view showing the upsetting of said portion between the rim base sections.

In carrying out my invention I employ the usual side members A and B to which the cushion tire C is vulcanized, leaving the centrally disposed recesses D which imparts the desired resiliency to the tire, this recess D being formed by means of a suitable core (not shown) which is withdrawn after the vulcanization has been completed; and the problem has been to introduce and permanently connect a bridging plate or ring between the side members A and B of the rim base, and this bridging member must be of such a nature that it can be quickly and easily introduced and brought into permanently locked relation with the side members of the rim base, and it is therefore with the object of accomplishing this construction and operation that I have devised a novel form of central bridging ring E and method of connecting the same to the side members.

In practice the opposed edges of the base sections A and B are undercut or shouldered as shown at A' and B', and the ring E has laterally extending portions E' which are complementary to the shouldered portions A' and B', so that when the bridge ring is properly positioned the lateral shouldered portion of the ring E will interlock with the undercut or shouldered portions of the side sections A and B.

In order to permanently lock the central ring into permanent fixed relation with the side portions of the rim base, I provide a ring which is initially of slightly greater circumference than the circumference of the rim base sections A and B and this initially larger ring is crimped internally as shown at $E^2$ at one or more points, so as to make the ring as a whole sufficiently small to permit it to be readily introduced into the rim base and positioned centrally thereof, and then by any suitable expanding device indicated by F the crimped portions $E^2$ are pressed back to their normal positions, and in accomplishing this operation the expanding device also crowds and compresses the ring into the exact lineal dimensions of the sections A and B.

By way of illustration, it may be pointed out that the circumference of one standard rim base is 94.1 inches and the actual circumferential measurement of the ring E (for this rim base) before it is crimped is 94.249 inches and after the ring has been inserted and bulldozed or uncrimped by the expanding device F it is brought back to 94.1 inches thereby forcing .149 of an inch of metal back under compression during the process and this compressive action firmly unites the central ring E into locked relation with the side members A and B.

However, to provide against any possible dislocation and liability to shift circumferentially I may cut away the extending portions E' at definite intervals as indicated at $E^3$ thereby leaving the central portion of the ring without such side extensions and this intervening portion of the ring can be upset slightly so as to force the same radially outwardly into the space D as most clearly shown, and in upsetting these portions in this manner the adjacent side extensions E' are jammed into binding contact with the shouldered portions of the side portions A and B and thereby effectually lock these parts together and prevent any possible circumferential shifting.

A rim base of this construction and made according to this method has the advantage of being cheaper than those in which the central ring is connected by welding, and it also has the advantage of rapidity of assemblage inasmuch as the crimped rings can be quickly and easily placed within the rim base and by expanding said clamped ring and at the same time effecting a compression thereof in the rim base a much stronger and durable composite rim base is obtained.

What I claim is:—

1. The herein described method which consists in vulcanizing a cushion tire upon spaced tire rim base members, providing a central bridging ring of greater initial circumference than said base members, reducing the diameter of said ring to position the same within the base members and then reshaping said ring and compressing the same into interlocked engagement with the rim base members.

2. The herein described method which consists in vulcanizing a cushion tire upon spaced tire rim base members, providing a central bridging ring of greater initial circumference than said base members, placing said ring between said base members and then forcing said ring to conform to the circular shape of said base members and bringing said ring into locked relation with said base members.

3. The process of producing a base for cushion tires which consists in placing a ring having radially depressed portions between spaced annular side sections and expanding said ring into engagement with said side sections throughout its peripheral edges to form a completely closed rigid base for said tire.

In testimony whereof, I hereunto affix my signature.

HARRY W. KRANZ.